United States Patent
Wu et al.

(10) Patent No.: US 12,429,887 B2
(45) Date of Patent: Sep. 30, 2025

(54) POSE ADJUSTMENT METHOD, POSE ADJUSTMENT DEVICE, ELECTRONIC EQUIPMENT AND READABLE STORAGE MEDIUM

(71) Applicant: FJ Dynamics Co., Ltd., Shenzhen (CN)

(72) Inventors: Di Wu, Xiangyang (CN); Wen-Quan Zhao, Xiangyang (CN); Qi-Chang Zhang, Xiangyang (CN); Xu-Bin Luo, Shenzhen (CN)

(73) Assignee: FJ Dynamics Co., Ltd., Shenzhen (CN)

( * ) Notice: Subject to any disclaimer, the term of this patent is extended or adjusted under 35 U.S.C. 154(b) by 0 days.

(21) Appl. No.: 18/694,511

(22) PCT Filed: May 19, 2023

(86) PCT No.: PCT/CN2023/095353
§ 371 (c)(1),
(2) Date: Mar. 22, 2024

(87) PCT Pub. No.: WO2024/093203
PCT Pub. Date: May 10, 2024

(65) Prior Publication Data
US 2025/0130573 A1    Apr. 24, 2025

(30) Foreign Application Priority Data
Nov. 2, 2022   (CN) .......................... 202211364479.8

(51) Int. Cl.
*G05D 1/24*     (2024.01)
*G01C 21/16*    (2006.01)
(Continued)

(52) U.S. Cl.
CPC ............. *G05D 1/24* (2024.01); *G01C 21/165* (2013.01); *G05D 2111/30* (2024.01); *G05D 2111/50* (2024.01)

(58) Field of Classification Search
CPC .. G05D 1/24; G05D 2111/30; G05D 2111/50; G01C 21/165
See application file for complete search history.

(56) References Cited

U.S. PATENT DOCUMENTS

| | | | |
|---|---|---|---|
| 9,767,577 B2* | 9/2017 | Menozzi | G06F 1/163 |
| 12,061,277 B1* | 8/2024 | Fang | G01S 5/0264 |

(Continued)

FOREIGN PATENT DOCUMENTS

| | | |
|---|---|---|
| CN | 105043385 A | 11/2015 |
| CN | 109959381 A | 7/2019 |

(Continued)

*Primary Examiner* — Ramsey Refai
(74) *Attorney, Agent, or Firm* — ScienBiziP, P.C.

(57) ABSTRACT

The application provides a pose adjustment method, a pose adjustment device, an electronic equipment, and a readable storage medium. The method includes: obtaining coordinates and noise parameters of the mobile device at a previous moment, the coordinates and the noise parameters at the previous moment being predicted by a Kalman filter model, the previous moment is a previous moment adjacent to a current moment; obtaining several measurement coordinates of the mobile device at the current moment through several measurement modules; predicting coordinates of the mobile device at the current moment through the Kalman filter model based on the several measured coordinates, the coordinates of the previous moment, and the noise parameters of the previous moment; and adjusting the pose of the mobile device at the current moment based on the coordinates of the current moment and a preset trajectory of the mobile device. The pose adjustment method may improve positioning accuracy.

16 Claims, 3 Drawing Sheets

(51) Int. Cl.
*G05D 111/30* (2024.01)
*G05D 111/50* (2024.01)

(56) References Cited

U.S. PATENT DOCUMENTS

| | | | | |
|---|---|---|---|---|
| 2004/0168148 | A1* | 8/2004 | Goncalves | G05D 1/0231 |
| | | | | 717/104 |
| 2013/0325334 | A1* | 12/2013 | Mian | G05D 1/0278 |
| | | | | 701/518 |
| 2018/0088597 | A1* | 3/2018 | Shen | G05D 1/102 |
| 2020/0119811 | A1* | 4/2020 | Kay | H04B 10/118 |
| 2020/0206945 | A1* | 7/2020 | Xiong | B25J 9/1692 |
| 2022/0341737 | A1* | 10/2022 | Shen | G01C 21/165 |

FOREIGN PATENT DOCUMENTS

| | | |
|---|---|---|
| CN | 113280808 A | 8/2021 |
| CN | 114166218 A | 3/2022 |

\* cited by examiner

POSE ADJUSTMENT METHOD, POSE ADJUSTMENT DEVICE, ELECTRONIC EQUIPMENT AND READABLE STORAGE MEDIUM

CROSS-REFERENCE TO RELATED APPLICATIONS

This application claims priority to China Application No. 202211364479.8 filed on Nov. 2, 2022, in the China National Intellectual Property Administration, with a title of "pose adjustment method, pose adjustment device, electronic equipment and readable storage medium", the contents of which are incorporated by reference herein.

TECHNICAL FIELD

The present disclosure relates to positioning field, in particular to a pose adjustment method, a pose adjustment device, an electronic equipment, and a readable storage medium.

BACKGROUND

Robot real-time positioning technology is the key for robots to achieve autonomous navigation, which allows robots to be used in various automation scenarios, such as agricultural automation scenarios and logistics automation scenarios. However, during the operation of the robot, there are errors in real-time positioning due to environmental factors in various using scenarios, such as weather effects, obstacles on the road, bumps on the ground, etc. This will greatly affect the accuracy of robot positioning.

SUMMARY OF THE INVENTION

One of the main advantages of the present disclosure is to provide a pose adjustment method, a pose adjustment device, an electronic equipment, and a readable storage medium, so as to improve positioning accuracy.

On a first hand of the application, providing a pose adjustment method applied in a mobile device, the pose adjustment method includes: obtaining coordinates and noise parameters of the mobile device at a previous moment, the coordinates and the noise parameters at the previous moment being predicted by a Kalman filter model, the previous moment is a previous moment adjacent to a current moment; obtaining several measurement coordinates of the mobile device at the current moment through several measurement modules; predicting coordinates of the mobile device at the current moment through the Kalman filter model based on the several measured coordinates, the coordinates of the previous moment, and the noise parameters of the previous moment; and adjusting the pose of the mobile device at the current moment based on the coordinates of the current moment and a preset trajectory of the mobile device. The application combines the coordinates and the noise parameters of the previous moment obtained based on the Kalman filter model with the several measurement coordinates of the current moment to predict the coordinates of the mobile device at the current moment through the Kalman filter model, so as to greatly reduce external environment interference and sensor interference, thereby obtaining more accurate coordinates of the mobile device at the current moment.

According to an embodiment of the application, the Kalman filter model includes a coordinate update model and a noise update model, the predicting coordinates of the mobile device at the current moment through the Kalman filter model based on the several measured coordinates, the coordinates of the previous moment, and the noise parameters of the previous moment includes: outputting corresponding calculation parameters according to the coordinate update model and the noise update model respectively based on the several measurement coordinates, the coordinates of the previous moment, and the noise parameters of the previous moment; obtaining the coordinates of the current moment according to the coordinate update model based on the several measurement coordinates, the coordinates of the previous moment, the noise parameters of the previous moment, and the calculation parameters outputted based on the noise update model; obtaining the noise parameters of the current moment according to the noise update model based on the several measurement coordinates, the coordinates of the previous moment, the noise parameters of the previous moment, and the calculation parameters outputted based on the coordinate update model. The application introduces the coordinate update model and the noise update model into the Kalman filter model, and enables the noise parameters to participate in the prediction operation of the coordinates at the current moment in real time and dynamically, so as to further improve the accuracy of the coordinates at the current moment predicted based on the Kalman filter model.

after adjusting the pose of the mobile device at the current moment based on the coordinates of the current moment and the preset trajectory of the mobile device, the pose adjustment method further includes:

updating the coordinates and the noise parameters of the current moment to the coordinates and the noise parameters of the previous moment.

According to an embodiment of the application, the noise parameters comprise observation noise parameters and state noise parameters, the observation noise parameters represent noise caused by the external working environment of the mobile device, the state noise parameters represent noise caused by errors in the measurement modules. The application introduces the observation noise parameters and the state noise parameters to achieve real-time dynamic prediction of the observation noise parameters and the state noise parameters through the Kalman filter model, then the predicted observation noise parameters and state noise parameters at the current moment are involved in predicting the coordinates at the current moment, solving the problem in the multi-sensor fusion positioning method that the state estimation is affected by external uncertain factors and causes the traditional Kalman filter to diverge, meanwhile solving the problem of the inability of each sensor to eliminate accumulated errors in time and thereby achieve continuous and seamless navigation.

According to an embodiment of the application, the state noise parameters comprise state noise mean values and state noise variances, the observation noise parameters comprise observation noise mean values and observation noise variances; the noise update model comprises following equations:

$$q_k = (1-d_k)q_{k-1} + d_k(X_k - AX_{k-1});$$

$$Q_k = (1-d_k)Q_{k-1} + d_k(K_k e_k e_k^T K_k^T + P_k - AP_{k-1}A^T);$$

-continued $$r_k = (1-d_k)r_{k-1} + d_k(Z_k - HX_{kVk-1});$$

$$R_k = (1-d_k)R_{k-1} + d_k(e_k e_k^T - HP_{kVk-1}H^T);$$

wherein, $q_k$ is a mean value of the state noises of the mobile device at the current moment; $d_k=(1-b)/(1-b^{k+1})$, b is a forgetting factor, with a range of 0<b<1; $q_{k-1}$ is a mean value of the state noises of the mobile device at the previous moment; $X_k$ is the coordinates of the mobile device at the current moment; A is a state transition matrix; $X_{k-1}$ is the coordinates of the mobile device at the previous moment; $Q_k$ is a variance of the state noises of the mobile device at the current moment; $Q_{k-1}$ is a variance of the state noises of the mobile device at the previous moment; $K_k$ is a Kalman gain; $e_k$ is an error between a coordinate $X_k$ at the current moment and a coordinate $X_{kVk-1}$ with error at the current moment; $P_k$ is a covariance of the noise parameters of the mobile device at the current moment; $P_{k-1}$ is a covariance of the mobile device at the previous moment; $r_k$ is a mean value of the observation noises of the mobile device at the current moment; $r_{k-1}$ is a mean value of the observation noises of the mobile device at the previous moment; $Z_k$ is an observation data of the mobile device; H is an observation matrix; $X_{kVk-1}$ is a coordinate with error that the mobile device has not updated according to the variance of the state noises of the mobile device at the current moment; $R_k$ is a variance of the observation noises of the mobile device at the current moment; $R_{k-1}$ is a variance of the observation noises of the mobile device at the previous moment; $P_{kVk-1}$ is a covariance with error that the mobile device has not updated according to the observation matrix at the current moment.

According to an embodiment of the application, the several measurement modules comprise UWB modules, IMU modules, and odometer modules, the several measurement coordinates comprise first measurement coordinates, second measurement coordinates, and third measurement coordinates. Thus, the pose adjustment method further includes: obtaining the first measurement coordinates of the mobile device at the current moment through the UWB module; obtaining the second measurement coordinates of the mobile device at the current moment through the IMU module; and obtaining the third measurement coordinates of the mobile device at the current moment through the odometer module. The application obtains the several measurement coordinates of the mobile device at the current moment through the UWB module, the IMU module, and the odometer module to solve the problem of poor robustness caused by a single sensor in the pose adjustment method.

According to an embodiment of the application, the obtaining the second measurement coordinates of the mobile device at the current moment through the IMU module includes: obtaining first pose data of the mobile device through the IMU module; filtering the first pose data based on a moving average filtering algorithm; and processing the filtered first pose data based on a dead reckoning algorithm to obtain the second measurement coordinates. The application first filters the pose data obtained by the IMU module through the moving average filtering algorithm to reduce interference; and then processes the pose data through a dead reckoning algorithm to obtain second measurement coordinates with higher accuracy.

According to an embodiment of the application, the obtaining the first measurement coordinates of the mobile device at the current moment through the UWB module includes: communicating with several base stations through the UWB module to request ranging information, when a number of the base stations communicating with the UWB module is greater than or equal to a preset number, disconnecting communication from the base stations through the UWB module; determining the first measurement coordinates of the mobile device based on the ranging information returned by the base stations that maintain communication with the UWB module. The application uses the UWB module to disconnect communications from the base stations whose distance exceeds the preset threshold, thereby expanding the mobile range of the mobile device.

On a second hand of the application, providing a pose adjustment device applied in a mobile device, the pose adjustment device includes: a first obtaining module configured to obtain coordinates and noise parameters of the mobile device at a previous moment, the coordinates and the noise parameters at the previous moment being predicted by a Kalman filter model, the previous moment is a previous moment adjacent to a current moment; a second obtaining module configured to obtain several measurement coordinates of the mobile device at the current moment through several measurement modules; a third obtaining module configured to predict coordinates of the mobile device at the current moment through the Kalman filter model based on the several measured coordinates, the coordinates of the previous moment, and the noise parameters of the previous moment; and an adjustment module configured to adjust the pose of the mobile device at the current moment based on the coordinates of the current moment and a preset trajectory of the mobile device.

On a third hand of the application, providing a computer-readable storage medium, the computer-readable storage medium stores at least one instruction, the at least one instruction executed by a processor in an electronic equipment to implement the pose adjustment method.

On a fourth hand of the application, providing an electronic equipment, the electronic equipment includes: a memory storing at least one instruction; and a processor configured to execute the at least one instruction stored in the memory to implement the pose adjustment method.

The pose adjustment method provided by the application uses the Kalman filter model to predict the coordinates of the mobile device at the current moment based on the coordinates of the previous moment, the noise parameters of the previous moment, and the several measurement coordinates of the current moment, thus, not only reducing the problem of Kalman filter divergence caused by environmental interference and sensor interference during the positioning process of the mobile device, but also continuously obtaining more accurate coordinates of the mobile device, eliminating accumulated errors in a timely manner, and more effectively calibrate the deviation between the actual trajectory of the mobile device and the preset trajectory to achieve seamless navigation.

| | |
|---|---|
| pose adjustment device | 100 |
| first obtaining module | 10 |
| second obtaining module | 20 |
| third obtaining module | 30 |
| adjustment module | 40 |
| electronic equipment | 200 |
| processor | 201 |
| memory | 202 |
| computer program | 203 |

The following specific embodiments will further describe the present application in conjunction with the above-mentioned drawings.

DETAILED DESCRIPTION

The following description is used to disclose the present disclosure so that those skilled in the art can implement the present disclosure. The preferred embodiments in the following description are only examples, and those skilled in the art can think of other obvious variations. The basic principles of the present disclosure defined in the following description can be applied to other embodiments, modifications, improvements, equivalents, and other technical solutions that do not depart from the spirit and scope of the present disclosure.

Those skilled in the art should understand that, in the disclosure of the present disclosure, the terms "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, which is only for the convenience of describing the present disclosure and to simplify the description, rather than indicating or implying that the device or element referred to must have a specific orientation, or be constructed and operated in a specific orientation, so the above terms should not be understood as limiting the present disclosure.

It can be understood that the term "a" should be understood as "at least one" or "one or more", that is, in one embodiment, the number of an element may be one, and in another embodiment, the number of the elements can be more than one, and the term "one" cannot be taken as a restriction on the number.

Robot real-time positioning technology is the key for robots to achieve autonomous navigation, which allows robots to be used in various automation scenarios, such as agricultural automation scenarios and logistics automation scenarios. However, during the operation of the robot, there are errors in real-time positioning due to environmental factors in various using scenarios, such as weather effects, obstacles on the road, bumps on the ground, etc. This will greatly affect the accuracy of robot positioning.

Based on this, embodiments of the present application provide a pose adjustment method to achieve more accurate robot positioning.

Figure 1:
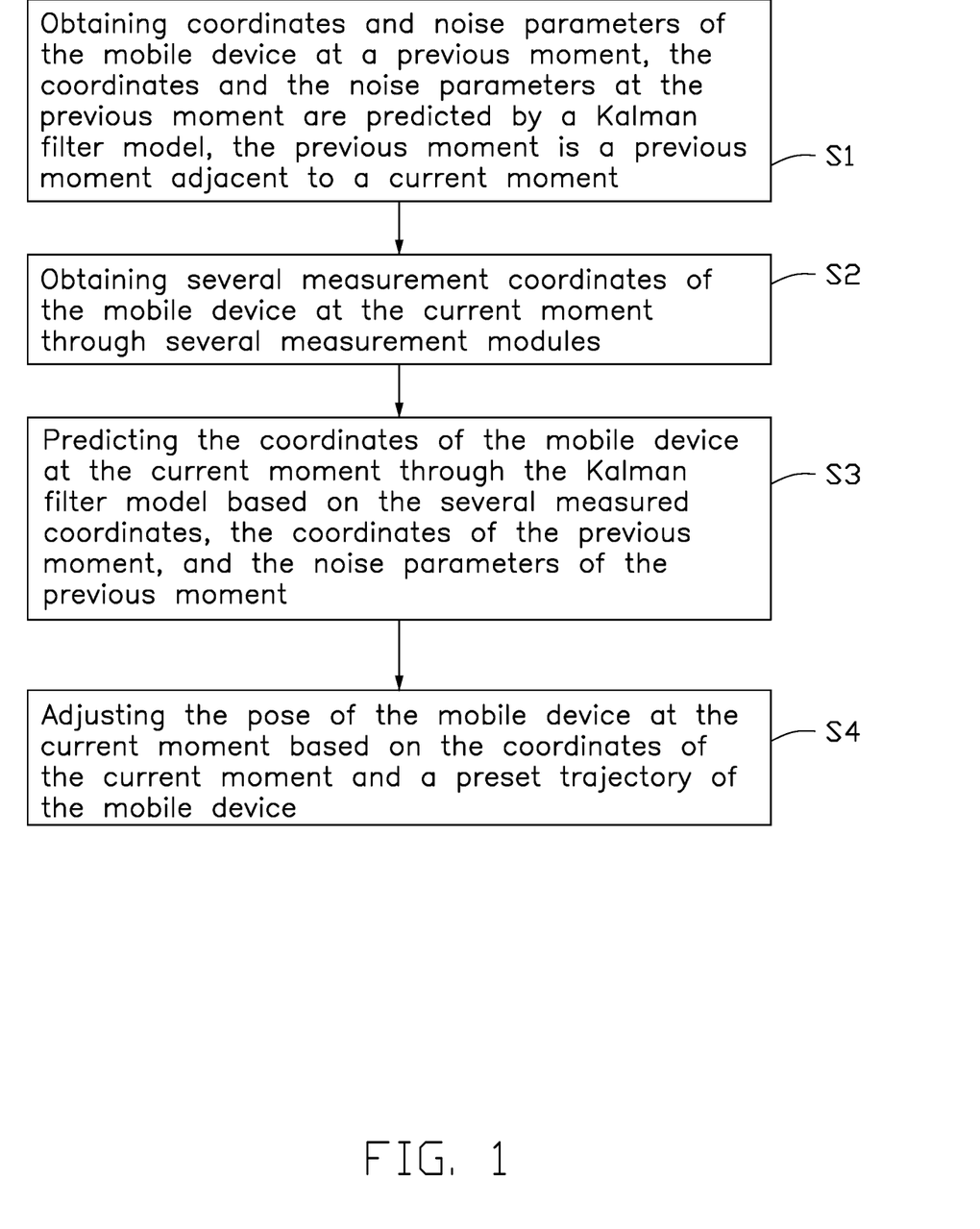
FIG. 1 is a flowchart of a pose adjustment method according to an embodiment of the present application.

Referring to FIG. 1, FIG. 1 is a flowchart of a pose adjustment method according to an embodiment of the present application. It should be understood that although various steps in the flowchart of FIG. 1 are shown in sequence as indicated by arrows, these steps are not necessarily executed in the order indicated by arrows. Unless explicitly stated in this application, the execution of these steps is not strictly limited in order, and they can be executed in other orders. Moreover, at least some of the steps in the figure may include multiple sub-steps or multiple stages. These sub-steps or stages are not necessarily executed at the same time, but may be executed at different times, and their execution order is not necessarily sequential, may be performed in turn or alternately with other steps or sub-steps of other steps or at least part of stages. Therefore, depending on different needs, the order of steps in this flowchart can be changed, and some steps can be omitted.

The pose adjustment method may be applied in a mobile device (not shown in the figure) and executed by a processor on the mobile device. It can be understood that the mobile device can be a material pushing robot, a lawn mower, or any other mobile electronic equipment (see FIG. 3).

In some embodiments, the pose adjustment method may include the following steps.

In step S1, obtaining coordinates and noise parameters of the mobile device at a previous moment, the coordinates and the noise parameters at the previous moment are predicted by a Kalman filter model. Wherein, the previous moment is a previous moment adjacent to a current moment.

In the present embodiment, after the processor of the mobile device received a positioning instruction, the mobile device starts to move, the processor first obtains initial coordinates and initial noise parameters of the mobile device at an initial moment before starting to move. The initial coordinates are used to describe the coordinates of the mobile device at the initial moment. The initial noise parameters are parameters initialized by the mobile device based on a noise model at the initial moment. For example, in some embodiments, the noise model may be a Gaussian noise model, a random noise model, a salt-and-pepper noise model, or the like.

After the processor obtained the initial coordinates and the initial noise parameters, the processor may predict coordinates and noise parameters of the mobile device at a next moment after the initial moment through the Kalman filter model based on the initial coordinates and the initial noise parameters.

Thus, after starting to positioning the mobile device, the processor may also obtain the coordinates and noise parameters of the mobile device at the previous moment predicted by the Kalman filter model based on a preset period.

Wherein, the previous moment refers to a previous moment adjacent to the current moment. For example, when the preset period is 1 second, the mobile device obtains the coordinates and noise parameters of the mobile device at the previous moment predicted by the Kalman filter model every 1 second. In detail, for example, the time corresponding to the current moment is 12:00, and the time corresponding to the previous moment is 11:59.

It should be noted that if the current moment is the moment next to the initial moment, the coordinates and noise parameters of the previous moment obtained by the processor are the initial coordinates and initial noise parameters.

In step S2, obtaining several measurement coordinates of the mobile device at the current moment through several measurement modules.

After the positioning is started, the mobile device moves in a preset direction, and the processor also obtains several measurement coordinates of the mobile device at the current moment through several measurement modules. It can be understood that in this embodiment of the present application, the current moment does not include the initial moment.

Wherein, the measurement module may be a positioning-related sensor. For example, in some embodiments, the measurement module includes but is not limited to an ultra-wideband (UWB) positioning module, an Inertial Measurement Unit (IMU), an odometer module or a positioning module based on a Global Positioning System (GPS), etc. This application does not limit the specific type of the measurement module.

The measurement module is used to obtain pose data of the mobile device. It can be understood that the pose data includes but is not limited to position information, linear velocity information, linear acceleration information, angular velocity information, and declination information, etc.

The measurement coordinates may be calculated based on the pose data obtained by the measurement module, so as to obtain the coordinates of the mobile device. It can be understood that in the embodiment of the present application, the measurement coordinates of the mobile device and the coordinates predicted by the mobile device based on the Kalman filter model are coordinates in a same coordinate system. For example, in some embodiments, the coordinate system may be a coordinate system established with at least the location at the initial moment as the origin.

It can be understood that the several measurement modules in step S2 refer to at least one measurement module, and correspondingly, the several measurement coordinates refer to at least one measurement coordinate.

In step S3, predicting the coordinates of the mobile device at the current moment through the Kalman filter model based on the several measured coordinates, the coordinates of the previous moment, and the noise parameters of the previous moment.

It can be understood that after the mobile device starts moving, some measurement coordinates obtained in step S2 may deviate from actual coordinates of the mobile device due to external interference or errors in the measurement module. Therefore, in order to obtain more accurate coordinates of the mobile device, in step S3, in addition to the measurement coordinates of the mobile device at the current moment, the coordinates of the mobile device at the previous moment and the noise parameters of the previous moment are also introduced to participate in the calculation, and predicts the coordinates of the mobile device at the current moment based on the Kalman filter model to improve an accuracy of positioning of the mobile device.

Further, in some embodiments, the Kalman filter model includes a coordinate update model and a noise update model. Wherein, the coordinate update model is used to generate the coordinates of the mobile device at the next moment. The noise update model is used to generate noise parameters of the mobile device at the next moment. The coordinate update model and the noise update model interact with each other to generate the coordinates of the mobile device at the current moment and the noise parameters at the current moment.

For example, in some embodiments, step S3 further includes following sub-steps:

In step S31, outputting corresponding calculation parameters according to the coordinate update model and the noise update model respectively based on the several measurement coordinates, the coordinates of the previous moment, and the noise parameters of the previous moment.

In the embodiment of the present application, in step S31, the processor outputs first calculation parameters according to the coordinate update model based on the several measurement coordinates, the coordinates of the previous moment, and the noise parameters of the previous moment. The processor also outputs second calculation parameters according to the noise update model based on the several measurement coordinates, the coordinates of the previous moment, and the noise parameters of the previous moment.

In step S32, obtaining the coordinates of the current moment according to the coordinate update model based on the several measurement coordinates, the coordinates of the previous moment, the noise parameters of the previous moment, and the calculation parameters outputted based on the noise update model.

In step S32, the processor obtains the coordinates of the mobile device at the current moment based on the several measurement coordinates, the coordinates of the previous moment, the noise parameters of the previous moment, and the calculation parameters outputted based on the noise update model.

In step S33, obtaining the noise parameters of the current moment according to the noise update model based on the several measurement coordinates, the coordinates of the previous moment, the noise parameters of the previous moment, and the calculation parameters outputted based on the coordinate update model.

In step S33, the processor obtains the noise parameters of the mobile device at the current moment according to the noise update model based on the several measurement coordinates, the coordinates of the previous moment, the noise parameters of the previous moment, and the calculation parameters outputted based on the coordinate update model.

It can be understood that the coordinates obtained through the above steps S31-S33 are not only obtained based on the coordinates of the previous moment, the noise parameters of the previous moment, and the several measurement coordinates, but are actually also obtained based on the noise parameters of the current moment. Thus, the accuracy of the current coordinates of the mobile device can be further improved. Similarly, the noise parameters of the mobile device at the current moment are not only obtained based on the coordinates of the previous moment, the noise parameters of the previous moment, and the several measurement coordinates; the noise parameters of the mobile device at the current moment are also obtained based on the coordinates of the mobile device at the current moment. That is, in the embodiment of the present application, the noise parameters of the mobile device at the current moment are updated and iterated in real time together with the coordinates at the current moment.

Thus, in steps S31-S33, the coordinate update model and the noise update model are introduced into the Kalman filter model, and the noise parameters are dynamically involved in the prediction operation of the coordinates at the current moment in real time to further improve the accuracy of the coordinates of the current moment predicted based on the Kalman filter model.

In order to better explain steps S31 to S32, the following content takes the coordinate update model as an extended Kalman filter model as an example, and combines the noise update model to explain the specific calculation process of the steps S31 to S32.

In detail, in some embodiments, the noise parameters include observation noise parameters and state noise parameters. Wherein, the observation noise parameters represent the noise caused by the external working environment of the mobile device. The state noise parameters represent the noise caused by errors in the measurement modules. In the embodiment of the application, the observation noise parameters are obtained based on Gaussian noise. The state noise parameters are obtained based on another Gaussian noise. And the two Gaussian noises are independent of each other. It can be understood that in other embodiments, the observation noise parameters and the state noise parameters can also be obtained based on other noise models, such as the random noise or the salt-and-pepper noise. The specific selected noise model can be determined according to the environment where the mobile device is located, and this application does not limit to this. It can be understood that in other embodiments, the observation noise parameters and the state noise parameters can also be obtained based on different types of noise models, and this application is not limited to this.

Further, the state noise parameters include state noise mean values and state noise variances. The observation noise parameters include observation noise mean values and observation noise variances.

Wherein, the coordinate update model includes following equations:

$$X_{kVk-1} = AX_{k-1} + BU_{k-1} + q_{k-1}; \quad (1)$$

$$P_{kVk-1} = AP_{k-1}A^T + Q_{k-1}; \quad (2)$$

$$K_k = P_{kVk-1}H^T[HP_{kVk-1}H^T + R_k]^{-1}; \quad (3)$$

$$e_k = Z_k - HX_{kVk-1} - r_{k-1}; \quad (4)$$

$$X_k = X_{kVk-1} + Q_k e_k; \quad (5)$$

$$P_k = [I - K_k H]P_{kVk-1}. \quad (6)$$

The noise update model includes following equations:

$$q_k = (1 - d_k)q_{k-1} + d_k(X_k - AX_{k-1}); \quad (7)$$

$$Q_k = (1 - d_k)Q_{k-1} + d_k(K_k e_k e_k^T K_k^T + P_k - AP_{k-1}A^T); \quad (8)$$

$$r_k = (1 - d_k)r_{k-1} + d_k(Z_k - HX_{kVk-1}); \quad (9)$$

$$R_k = (1 - d_k)R_{k-1} + d_k(e_k e_k^T - HP_{kVk-1}H^T). \quad (10)$$

Wherein, in the equation (1), $X_{kVk-1}$ is a coordinate with error that the mobile device has not updated according to the variance of the state noises of the mobile device at the current moment. A is a state transition matrix of the Kalman filter model. $X_{k-1}$ is the coordinates of the mobile device at the previous moment. B is a control gain matrix. $U_{k-1}$ is a control input variable related to the control of the mobile device at the previous moment. $q_{k-1}$ is a mean value of the state noise of the mobile device at the previous moment.

In the equation (2), $P_{kVk-1}$ is a covariance with error that the mobile device has not updated according to the observation matrix at the current moment. $P_{k-1}$ is a covariance of the noise parameters of the mobile device at the previous moment. $Q_{k-1}$ is a variance of the state noises of the mobile device at the previous moment.

In the equation (3), $K_k$ is a Kalman gain. H is an observation matrix. $R_k$ is a variance of the observation noises of the mobile device at the current moment.

In the equation (4), $e_k$ is an error between the coordinate $X_k$ at the current moment and the coordinate $X_{kVk-1}$ with error at the current moment. $Z_k$ is an observation data of the mobile device, which can be composed of pose data obtained by the several measurement modules. $r_{k-1}$ is the mean value of the observation noises of the mobile device at the previous moment.

In the equation (5), $X_k$ is the coordinates of the mobile device at the current moment; $Q_k$ is the variance of the state noises of the mobile device at the current moment.

In the equation (6), $P_k$ is the covariance of the noise parameters of the mobile device at the current moment. I is an identity matrix.

In the equation (7), $q_k$ is the mean value of the state noises of the mobile device at the current moment. $d_k=(1-b)/(1-b^{k+1})$, wherein b is a forgetting factor, with a range of $0<b<1$. In the embodiment of the application, the value range of b is [0.95, 0.99].

In the equation (8), $P_{k-1}$ is the covariance of the mobile device at the previous moment.

In the equation (9), $r_k$ is the mean value of the observation noises of the mobile device at the current moment.

In the equation (10), $R_{k-1}$ is the variance of the observation noises of the mobile device at the previous moment.

In detail, in step S31, the processor obtains the first calculation parameter based on the obtained measurement coordinates, the coordinates at the previous moment, the noise parameters at the previous moment, and the equations (1), (2), and (4) in the coordinate update model. The first calculation parameter includes the coordinates $X_k$ of the mobile device at the current moment, the coordinates $X_{kVk-1}$ with errors at the current moment, the Kalman gain $K_k$, the error $e_k$, the covariance $P_k$ at the current moment, and the covariance $P_{kvk-1}$ with errors that the mobile device has not updated according to the observation matrix at the current moment.

In the embodiment of the application, according to the noise update model, the coordinates $X_k$ at the current moment are parameters related to the mean value $q_k$ of the state noise at the current moment. The Kalman gain $K_k$, the error $e_k$ and the covariance $P_k$ at the current moment are parameters related to the variance $Q_k$ of the state noise at the current moment. The coordinate $X_{kvk-1}$ with error at the current moment is a parameter related to the mean value $r_k$ of the observation noise at the current moment. The error $e_k$ and the covariance $P_{kvk-1}$ with error are parameters related to the variance $R_k$ of the observation noise at the current moment.

In step S31, the processor also obtains the second calculation parameter based on the several obtained measurement coordinates, the coordinates at the previous moment, the noise parameters at the previous moment, and the equation (8) and equation (10) in the noise update model. The second calculation parameter includes the mean value $Q_k$ of the observation noise of the mobile device at the current time, and the variance $R_k$ of the observation noise of the mobile device at the current time. In the embodiment of the application, the second calculation parameters are all parameters related to the Kalman gain $K_k$ and the covariance $P_k$ of the noise parameter of the mobile device at the current time.

In detail, in step S32, the processor calculates the coordinates $X_k$ of the mobile device at the current moment according to the coordinate update model based on the several measurement coordinates, the coordinates of the previous moment, the noise parameters of the previous moment and the second calculation parameter.

It can be understood that according to the coordinate update model, based on the several measurement coordinates, the coordinates of the previous moment, and the noise parameters of the previous moment, the coordinates $X_{kvk-1}$ with error of the mobile device at the current moment, and the covariance $P_{kvk-1}$ with error of the mobile device at the current moment and the error $e_k$ can be directly obtained. Further, the processor further calculates the coordinates $X_k$ of the mobile device at the current moment according to the second calculation parameters, such as the mean value $Q_k$ of the observation noise of the mobile device at the current moment, the variance $R_k$ of the observation noise of the mobile device at the current moment, and equations (3), (5), and (6) in the coordinate update model.

In detail, in step S33, the processor calculates the noise parameters of the mobile device at the current moment based on the several measurement coordinates, the coordinates of the previous moment, the noise parameters of the previous moment and the first calculation parameter, and according to the noise update model.

It can be understood that according to the noise parameter update model, based on the several measurement coordinates, the coordinates of the previous moment, and the noise parameters of the previous moment, the mean value of the observation noise of the mobile device at the current moment can be directly obtained. Further, the processor further calculates the noise parameters of the mobile device at the current moment (including the mean value $q_k$ of the state noise at the current moment, the variance $Q_k$ of the state noise at the current moment, the mean value $r_k$ of the observation noise at the current moment, and the variance $R_k$ of the observation noise at the current moment) based on the first calculation parameter, such as the coordinates $X_k$ of the mobile device at the current moment, the coordinates $X_{kvk-1}$ with error, the Kalman gain $K_k$, the error $e_k$, the covariance $P_k$ at the current moment, the covariance $P_{kvk-1}$ with error, and the equations (7), (8), (9) and (10) in the noise update model.

Thus, based on the steps S31 to S33, when each current moment arrives, the processor can use the Kalman filter model to update and iterate the coordinates and the noise parameters of each current moment based on the coordinates and the noise parameters of the previous moment and the several measurement coordinates.

It can be understood that by introducing the observation noise parameters and the state noise parameters, real-time dynamic prediction of the observation noise parameters and the state noise parameters can be achieved through the Kalman filter model. Thus, the predicted observation noise parameters and the predicted state noise parameters at the current moment are involved in the prediction of the coordinates at the current moment, to solve the problem of traditional Kalman filter divergence caused by the state estimation is affected by external uncertain factors in the multi-sensor fusion positioning method, at the same time, to solve the problem that each sensor cannot eliminate the accumulated errors in time and thus cannot achieve continuous and seamless navigation.

It can be understood that in the embodiment of the application, at the initial moment, the initial noise parameters include the initial observation noise mean value, the initial observation noise variance, the initial state noise mean value, and the initial state noise variance. And the initial noise parameters can be obtained by random initialization at the initial moment from the two Gaussian noise models mentioned above.

It can be understood that in other embodiments, the coordinate update model can also be replaced by other models, such as any of the Kalman filter models such as the optimal estimation model of Kalman filter, adaptive Kalman filter model, unscented Kalman filter, etc., the application does not limit to this.

In step S4, adjusting the pose of the mobile device at the current moment based on the coordinates of the current moment and a preset trajectory of the mobile device.

In the step S4, after the processor obtains the coordinates of the mobile device at the current moment according to steps S1 to S3, when the coordinates of the mobile device at the current moment deviate from the preset trajectory of the mobile device, adjusting the pose of the mobile device at the current moment.

For example, in some embodiments, the preset trajectory includes several preset coordinates stored in a memory in the mobile device. The processor controls the mobile device to move to the target coordinates by calculating the position deviation between the coordinates at the current moment and the several preset coordinates, and selecting the preset coordinate corresponding to the minimum position deviation among the several preset coordinates as the target coordinates of the mobile device at the current moment.

It can be understood that the application does not limit the specific method of determining whether there is a deviation between the current coordinates of the mobile device and the preset trajectory of the mobile device in step S4. Those skilled in the art can make other adjustments as needed.

In some embodiments, the pose adjustment method of the application further includes:

In step S5, updating the coordinates and the noise parameters of the current moment to the coordinates and the noise parameters of the previous moment, and circularly executing the steps S1 to S5 until an instruction of stopping positioning is received.

It should be understood that in the step S5, by updating the coordinates and the noise parameters at the current moment to the coordinates and the noise parameters at the previous moment, the mobile device, when the next moment arrives, can continue to obtain the coordinates and the noise parameters at the current moment through the Kalman filter based on the coordinates and the noise parameters at the previous moment, as well as the several measurement coordinates.

It can be understood that through the loop of steps S1 to S5, not only the problem of the Kalman filter divergence caused by environmental interference and sensor interference during the positioning process of the mobile device can be reduced, but also more accurate coordinates of the mobile device can be continuously obtained, and the accumulated errors can be eliminated in time, and more effectively calibrating the deviation between the actual trajectory of the mobile device and the preset trajectory to achieve seamless navigation.

It can be understood that in some embodiments, the several measurement modules in step S2 include a UWB module, an IMU module and an odometer module. The UWB module, the IMU module and the odometer module are all electrically connected to the processor of the mobile device. Thus, the processor obtains multiple sets of pose data of the mobile device through the several measurement modules to reduce the problem of poor robustness of the mobile device caused by a single sensor and improve positioning accuracy.

In the embodiment of this application, step S2 includes the following sub-steps.

In step S21, obtaining the first measurement coordinates of the mobile device at the current moment through the UWB module.

In some embodiments, several base stations are also arranged around a movement route of the mobile device. The processor regularly requests ranging information from the base stations through the UWB module installed on the mobile device. The processor further calculates the first measurement coordinates of the mobile device in real time based on the ranging information returned by the several base stations.

It can be understood that the processor can calculate the distance between the mobile device and each base station based on a two-way ranging method, a one-way ranging method or other distance calculation methods. In some embodiments, the two-way ranging method may be any one of a time of flight (TOF) ranging method, a time of arrival (TOA) ranging method, a time difference of arrival (TDOA) method, or an angle of arrival (AOA) method. The one-way ranging method may be a one-way ranging method based on an emission time and an arrival time of a ranging signal outputted by the base station, etc.

In detail, in this embodiment of the application, the processor communicates with the several base stations through the UWB module to request the ranging information. When the number of the base stations communicating with the UWB module is greater than or equal to a preset number, the UWB module disconnects communication from the base stations whose distance exceeds a preset threshold. Then, the processor determines the first measurement coordinates of the mobile device based on the ranging information returned by the several base stations that maintain communication with the UWB module.

Further, in some embodiments, after obtaining the ranging information, the processor can perform calculations according to the obtained ranging information based on the three-point positioning principle and the multi-variable positioning algorithm to obtain the first measurement coordinates of the mobile device.

It can be understood that in the embodiments of the application, by switching the UWB module to the several base stations, the first measurement coordinates can be obtained through the UWB module, and at the same time, the movement range of the mobile device can be expanded.

In some embodiments, the preset number can be three or more, the application does not limit the preset number.

In step S22, obtaining the second measurement coordinates of the mobile device at the current moment through the IMU module.

It can be understood that the IMU module includes a three single-axis accelerometer and a three single-axis gyroscope. Wherein, the accelerometer is used to detect acceleration signals of the mobile device on each axis in the coordinate system. The gyroscope is used to detect angular velocities and accelerations of the mobile device in the coordinate system, and to calculate the pose of the mobile device.

In some embodiments, step S22 includes the following sub-steps:

In step S221, obtaining first pose data of the mobile device through the IMU module.

It can be understood that the first pose data includes pose data such as velocity data and acceleration data.

In step S222, filtering the first pose data based on a moving average filtering algorithm.

Thus, a noise of the first pose data can be decreased.

In step S223, processing the filtered first pose data based on a dead reckoning algorithm to obtain the second measurement coordinates.

In some embodiments, the dead reckoning algorithm includes following equations.

$$v_t = v_{t-1} + \int_0^{\Delta t} a d_t \quad (11)$$

$$S_t = S_{t-1} + v_{t-1}\Delta t + \int_0^{\Delta t} a d_t \quad (12)$$

Wherein, $v_t$ is a current speed of the mobile device, $v_{t-1}$ is a speed of the mobile device at the previous moment, $S_t$ is a distance of the mobile device from a starting point at the current moment, $S_{t-1}$ is a distance of the mobile device from the starting point at the previous moment, and a is a linear acceleration obtained by the mobile device through the IMU module. Thus, in step S223, the processor can calculate a distance and a speed direction of the movement of the mobile device based on the equations (11) and (12), thereby calculating the second measurement coordinates of the mobile device relative to the starting point.

It can be understood that in other embodiments, step S22 can also be implemented by other methods and is not limited to the steps S221-S223. For example, in some application scenarios, the mobile device may further include a GPS positioning module. Thus, when the mobile device works in a place with poor GPS signal, the processor can obtain intermediate coordinates before the GPS signal is disconnected through the GPS positioning module. Then the IMU module further calculates relative coordinates of the mobile device relative to the intermediate coordinates according to the method of the steps S221-S223. Thus, the processor can further obtain the second measurement coordinates of the mobile device at the current time based on the intermediate coordinates and the relative coordinates.

In step S23, obtaining the third measurement coordinates of the mobile device at the current moment through the odometer module.

It can be understood that in step S23, the processor obtains the second pose data such as a movement distance, an angular velocity and a linear velocity of the mobile device through the odometer module, and then performs derivation processing on the moving distance data in the second pose data to obtain the speed of the mobile device, so that the third measurement coordinates of the mobile device can be further calculated.

In the embodiment of the application, the first measurement coordinate, the second measurement coordinate, and the third measurement coordinate are coordinates in the same coordinate system. For example, in some embodiments, the first measurement coordinate, the second measurement coordinate, and the third measurement coordinate are coordinate data in the same world coordinate system.

It can be understood that in the embodiment of the application, several measurement coordinates of the mobile device at the current moment are obtained through the UWB module, the IMU module, and the odometer module. Compared with obtaining the measurement coordinates of the mobile device at the current moment through a single sensor, the robustness of the pose adjustment method can be improved.

It can be understood that the pose adjustment method provided by the application, combined with the noise update equation, performs real-time dynamic estimation of the observation noise and the state noise of the mobile device, and then uses the estimated observation noise and the estimated state noise in the algorithm of Kalman filter calculation fusion coordinates, solving the problem that the state estimation in the multi-sensor fusion positioning method is affected by external uncertain factors, which causing the traditional Kalman filter to diverge, meanwhile, solving the problem that the accumulated errors of each sensor cannot be eliminated in time and thus cannot achieve continuous and seamless navigation, further improving the accuracy of real-time positioning of the mobile device, which is beneficial to improving the operating efficiency and user experience of the mobile device.

Figure 2:
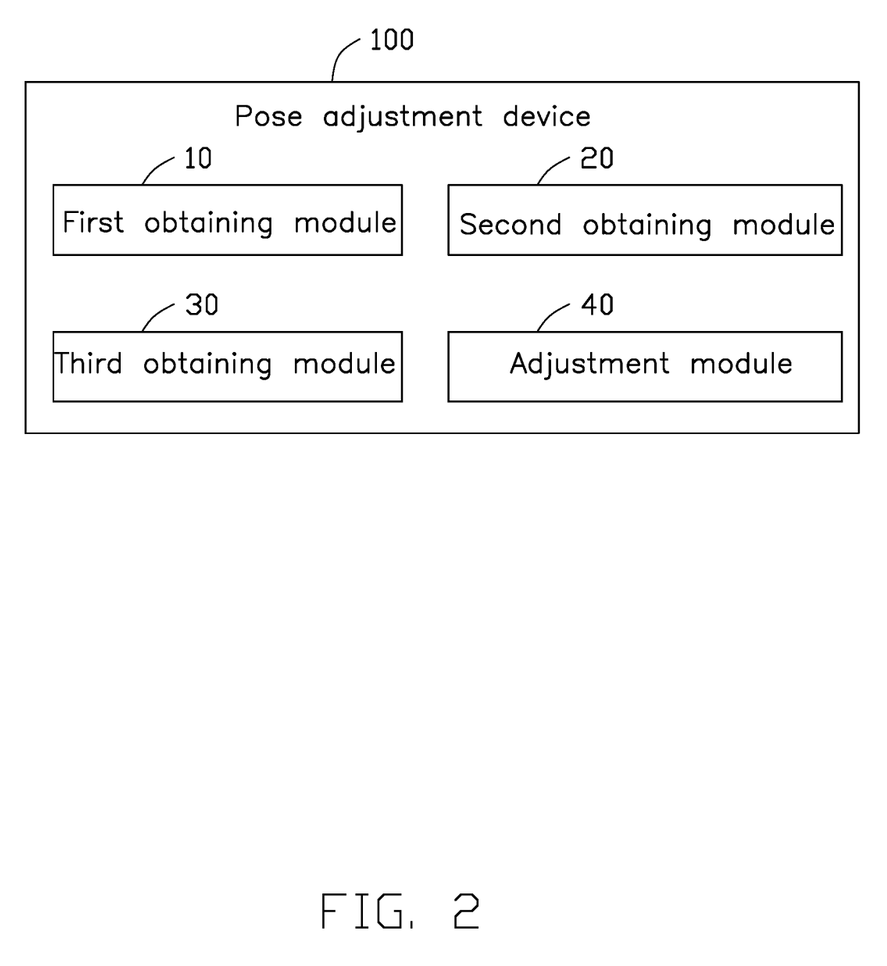
FIG. 2 is a functional block diagram of a pose adjustment device according to the embodiment of the present application.

Referring to FIG. 2, a second embodiment of the application also provides a pose adjustment device 100, which can be applied to the mobile device. The pose adjustment device 100 includes a first obtaining module 10, a second obtaining module 20, a third obtaining module 30, and an adjustment module 40.

Wherein, the first obtaining module 10 is used to obtain the coordinates and the noise parameters of the mobile device at the previous moment. The coordinates and the noise parameters at the previous moment are predicted by the Kalman filter model. The previous moment is a previous moment adjacent to the current moment.

The second obtaining module 20 is used to obtain several measurement coordinates of the mobile device at the current moment through several measurement modules.

The third obtaining module 30 is used to predict the coordinates of the mobile device at the current moment through the Kalman filter model based on the several measured coordinates, the coordinates of the previous moment, and the noise parameters of the previous moment.

The adjustment module 40 is used to adjust the pose of the mobile device at the current moment based on the coordinates of the current moment and a preset trajectory of the mobile device.

Figure 3:
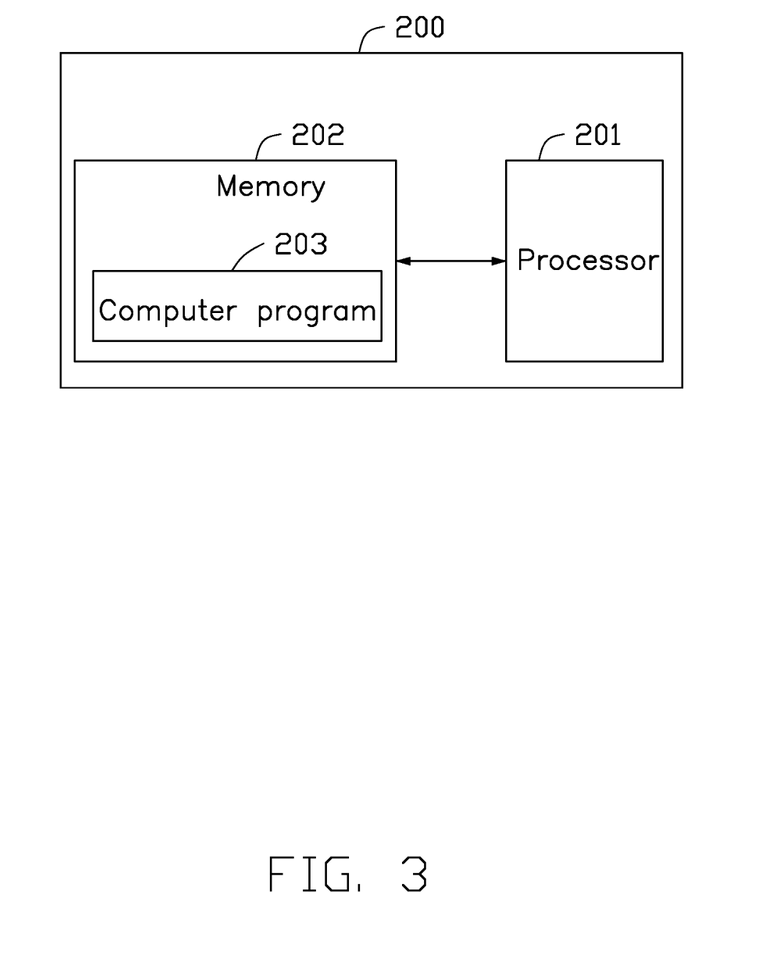
FIG. 3 is a structural schematic diagram of an electronic equipment according to the embodiment of the present application.

It can be understood that each module in the pose adjustment device 100 can be implemented in whole or in part by software, hardware, and combinations thereof. Each of the above-mentioned modules can be embedded in the processor in the form of hardware or independent of the processor, or can be stored in the memory in the form of software, so that the processor can invoke and execute the operations corresponding to each of the above-mentioned modules. Wherein, the first obtaining module 10, the second obtaining module 20, the third obtaining module 30, and the adjustment module 40 are used to perform each step in the embodiment corresponding to FIG. 1. For details, please refer to the relevant description of the previous embodiment, not repeating here. Referring to FIG. 3, a third embodiment of the application also provides an electronic equipment 200. The electronic equipment 200 includes a processor 201 and a memory 202. The memory 202 stores a computer program 203. The computer program 203 includes at least one instruction. The processor 201 is configured to execute the at least one instruction stored in the memory 202 to implement steps S1 to S5 in the above embodiments of the pose adjustment method.

Further, the computer program 203 may be divided into one or more units, the one or more units are stored in the memory 202 and executed by the processor 201 to complete the application. The one or more units may be a series of computer program instruction segments capable of completing specific functions. The instruction segments are used to describe the execution process of the computer program 203 in the electronic equipment. For example, the computer program 203 can be divided into a first obtaining unit, a second obtaining unit, a third obtaining unit, and an adjustment unit. Specific functions of each unit are as follows:

The first obtaining unit is used to obtain the coordinates and the noise parameters of the mobile device at the previous moment. The coordinates and the noise parameters at the previous moment are predicted by the Kalman filter model. The previous moment is a previous moment adjacent to the current moment.

The second obtaining unit is used to obtain several measurement coordinates of the mobile device at the current moment through several measurement modules.

The third obtaining unit is used to predict the coordinates of the mobile device at the current moment through the Kalman filter model based on the several measured coordinates, the coordinates of the previous moment, and the noise parameters of the previous moment.

The adjustment unit is used to adjust the pose of the mobile device at the current moment based on the coordinates of the current moment and a preset trajectory of the mobile device.

It can be understood that the electronic equipment 200 may include, but is not limited to, a processor 201 and a memory 202. Those skilled in the art can understand that FIG. 3 is only an example of the electronic equipment 200 and does not constitute a limitation of the electronic equipment 200. The electronic equipment 200 may include more or fewer components than shown, or some components may be combined, or different components may be used. For example, the electronic equipment 200 may also include input and output devices, network access devices, buses, motion mechanisms, etc.

It can be understood that the processor 201 can be a Central Processing Unit (CPU), or other general processor, a Digital Signal Processor (DSP), or an Application Specific Integrated Circuit (ASIC), a Field-Programmable Gate Array (FPGA) or other programmable logic devices, discrete gate or transistor logic devices, discrete hardware components, etc. The general processor can be a microprocessor or the processor 201 can be any conventional processor, etc. The processor 201 is the control center of the electronic equipment and uses various interfaces and buses to connect various parts of the entire electronic equipment.

The memory 202 may be used to store computer programs and/or modules/units. The processor 201 implements various functions of the electronic equipment by running or executing the computer programs and/or the modules/units stored in the memory 202, and invoking data stored in the memory 202. The memory 202 may mainly include a program storage area and a data storage area. Wherein, the program storage area can store an operating system, at least one application program required for a function (such as a sound playback function, an image playback function, etc.), etc. The data storage area can store data created based on the use of the electronic equipment (such as video data, audio data, phone books, etc.). In addition, the memory 202 may include a high-speed random access memory, and may also include a non-volatile memory, such as a hard disk, memory, a plug-in hard disk, a Smart Media Card (SMC), a Secure Digital (SD) card, a Flash Card, at least one disk storage device, a flash memory device, or other volatile solid-state storage devices.

Another embodiment of the application further provides a computer-readable storage medium that stores a computer program including at least one instruction, the at least one instruction is executed by a processor in an electronic equipment to implement the above-mentioned pose adjustment method.

For example, the computer program may be divided into one or more modules/units, the one or more modules/units are stored in the memory 202 and executed by the processor 201 to complete the application. The one or more modules/units may be a series of computer program instruction segments capable of completing specific functions. The instruction segments are used to describe the execution process of the computer program in the electronic equipment.

The application implements all or part of the processes in the methods of the above-mentioned embodiments, and can also use a computer program to instruct relevant hardware to complete the process. The computer program can be stored in a computer-readable storage medium, when executed by the processor, the computer program can implement the steps of each of the above-mentioned method. Wherein, the computer program includes a computer program code, and the computer program code can be in the form of source code, executable file or some intermediate form, etc. The computer-readable media may include: any entity or device that can carry computer program code, recording media, USB flash drives, mobile hard drives, magnetic disks, optical disks, computer memory, read-only memory (ROM), random access Memory (RAM), electrical signals, software distribution media, etc. It should be noted that the content contained in the computer-readable medium can be appropriately increased or decreased according to the requirements of legislation and patent practice in the jurisdiction. For example, in some jurisdictions, according to legislation and patent practice, the computer-readable medium does not include electrical carrier signals and telecommunications signals.

In the several embodiments provided in the application, it should be understood that the disclosed electronic equipment and method can be implemented in other ways. For example, embodiments of the electronic equipment described above are only illustrative. For example, the division of modules is only a logical function division, and there may be other division methods in actual implementation.

In addition, each functional module in each embodiment of the application can be integrated in the same processing module, or each module can exist physically alone, or two or more modules can be integrated in the same module. The above integrated modules can be implemented in the form of hardware or in the form of hardware plus software function modules.

Those skilled in the art should understand that the above description and the embodiments of the present disclosure shown in the drawings are only examples and do not limit the present disclosure. The purpose of the present disclosure has been completely and effectively achieved. The functions and structural principles of the present disclosure have been shown and explained in the embodiments. Without departing from the principles, the implementation of the present disclosure may have any deformation or modification.

What is claimed is:

1. A pose adjustment method applied in a mobile device, the pose adjustment method comprising:
obtaining coordinates and noise parameters of the mobile device at a previous moment, the coordinates and the noise parameters at the previous moment being predicted by a Kalman filter model, the previous moment is a previous moment adjacent to a current moment;
obtaining several measurement coordinates of the mobile device at the current moment through several measurement modules;
predicting coordinates of the mobile device at the current moment through the Kalman filter model based on the several measured coordinates, the coordinates of the previous moment, and the noise parameters of the previous moment; and
adjusting the pose of the mobile device at the current moment based on the coordinates of the current moment and a preset trajectory of the mobile device.

2. The pose adjustment method according to claim 1, wherein the Kalman filter model comprises a coordinate update model and a noise update model, the predicting coordinates of the mobile device at the current moment through the Kalman filter model based on the several measured coordinates, the coordinates of the previous moment, and the noise parameters of the previous moment comprises:
outputting corresponding calculation parameters according to the coordinate update model and the noise update model respectively based on the several measurement coordinates, the coordinates of the previous moment, and the noise parameters of the previous moment;
obtaining the coordinates of the current moment according to the coordinate update model based on the several measurement coordinates, the coordinates of the previous moment, the noise parameters of the previous moment, and the calculation parameters outputted based on the noise update model;
obtaining the noise parameters of the current moment according to the noise update model based on the several measurement coordinates, the coordinates of the previous moment, the noise parameters of the previous moment, and the calculation parameters outputted based on the coordinate update model;
after adjusting the pose of the mobile device at the current moment based on the coordinates of the current moment and the preset trajectory of the mobile device, the pose adjustment method further comprises:
updating the coordinates and the noise parameters of the current moment to the coordinates and the noise parameters of the previous moment.

3. The pose adjustment method according to claim 1, wherein the noise parameters comprise observation noise parameters and state noise parameters, the observation noise parameters represent noise caused by the external working environment of the mobile device, the state noise parameters represent noise caused by errors in the measurement modules.

4. The pose adjustment method according to claim 3, wherein the state noise parameters comprise state noise mean values and state noise variances, the observation noise parameters comprise observation noise mean values and observation noise variances; the noise update model comprises following equations:

$$q_k = (1-d_k)q_{k-1} + d_k(X_k - AX_{k-1});$$
$$Q_k = (1-d_k)Q_{k-1} + d_k(K_k e_k e_k^T K_k^T + P_k - AP_{k-1}A^T);$$
$$r_k = (1-d_k)r_{k-1} + d_k(Z_k - HX_{k\vee k-1});$$
$$R_k = (1-d_k)R_{k-1} + d_k(e_k e_k^T - HP_{k\vee k-1}H^T);$$

wherein, $q_k$ is a mean value of the state noises of the mobile device at the current moment; $d_k=(1-b)/(1-b^{k+1})$, b is a forgetting factor, with a range of $0<b<1$; $q_{k-1}$ is a mean value of the state noises of the mobile device at the previous moment; $X_k$ is the coordinates of the mobile device at the current moment; A is a state transition matrix; $X_{k-1}$ is the coordinates of the mobile device at the previous moment; $Q_k$ is a variance of the state noises of the mobile device at the current moment;

$Q_{k-1}$ is a variance of the state noises of the mobile device at the previous moment; $K_k$ is a Kalman gain; $e_k$ is an error between a coordinate $X_k$ at the current moment and a coordinate $X_{kVk-1}$ with error at the current moment; $P_k$ is a covariance of the noise parameters of the mobile device at the current moment; $P_{k-1}$ is a covariance of the mobile device at the previous moment; $r_k$ is a mean value of the observation noises of the mobile device at the current moment; $r_{k-1}$ is a mean value of the observation noises of the mobile device at the previous moment; $Z_k$ is an observation data of the mobile device; H is an observation matrix; $X_{kVk-1}$ is a coordinate with error that the mobile device has not updated according to the variance of the state noises of the mobile device at the current moment; $R_k$ is a variance of the observation noises of the mobile device at the current moment; $R_{k-1}$ is a variance of the observation noises of the mobile device at the previous moment; $P_{kVk-1}$ is a covariance with error that the mobile device has not updated according to the observation matrix at the current moment.

5. The pose adjustment method according to claim 1, wherein the several measurement modules comprise UWB modules, IMU modules, and odometer modules, the several measurement coordinates comprise first measurement coordinates, second measurement coordinates, and third measurement coordinates, the pose adjustment method further comprises:
obtaining the first measurement coordinates of the mobile device at the current moment through the UWB module;
obtaining the second measurement coordinates of the mobile device at the current moment through the IMU module; and
obtaining the third measurement coordinates of the mobile device at the current moment through the odometer module.

6. The pose adjustment method according to claim 5, wherein the obtaining the second measurement coordinates of the mobile device at the current moment through the IMU module comprises:
obtaining first pose data of the mobile device through the IMU module;
filtering the first pose data based on a moving average filtering algorithm; and
processing the filtered first pose data based on a dead reckoning algorithm to obtain the second measurement coordinates.

7. The pose adjustment method according to claim 5, wherein the obtaining the first measurement coordinates of the mobile device at the current moment through the UWB module comprises:
communicating with several base stations through the UWB module to request ranging information, when a number of the base stations communicating with the UWB module is greater than or equal to a preset number, disconnecting communication from the base stations through the UWB module;
determining the first measurement coordinates of the mobile device based on the ranging information returned by the base stations that maintain communication with the UWB module.

8. A pose adjustment device applied in a mobile device, the pose adjustment device comprising:
a first obtaining module configured to obtain coordinates and noise parameters of the mobile device at a previous moment, the coordinates and the noise parameters at the previous moment being predicted by a Kalman filter model, the previous moment is a previous moment adjacent to a current moment;
a second obtaining module configured to obtain several measurement coordinates of the mobile device at the current moment through several measurement modules;
a third obtaining module configured to predict coordinates of the mobile device at the current moment through the Kalman filter model based on the several measured coordinates, the coordinates of the previous moment, and the noise parameters of the previous moment; and
an adjustment module configured to adjust the pose of the mobile device at the current moment based on the coordinates of the current moment and a preset trajectory of the mobile device.

9. A computer-readable storage medium, the computer-readable storage medium storing at least one instruction, the at least one instruction executed by a processor in an electronic equipment to implement;
obtaining coordinates and noise parameters of the mobile device at a previous moment, the coordinates and the noise parameters at the previous moment being predicted by a Kalman filter model, the previous moment is a previous moment adjacent to a current moment;
obtaining several measurement coordinates of the mobile device at the current moment through several measurement modules;
predicting coordinates of the mobile device at the current moment through the Kalman filter model based on the several measured coordinates, the coordinates of the previous moment, and the noise parameters of the previous moment; and
adjusting the pose of the mobile device at the current moment based on the coordinates of the current moment and a preset trajectory of the mobile device.

10. An electronic equipment, the electronic equipment comprising:
a memory storing at least one instruction; and
a processor configured to execute the at least one instruction stored in the memory to implement;
obtaining coordinates and noise parameters of the mobile device at a previous moment, the coordinates and the noise parameters at the previous moment being predicted by a Kalman filter model, the previous moment is a previous moment adjacent to a current moment;
obtaining several measurement coordinates of the mobile device at the current moment through several measurement modules;
predicting coordinates of the mobile device at the current moment through the Kalman filter model based on the several measured coordinates, the coordinates of the previous moment, and the noise parameters of the previous moment; and
adjusting the pose of the mobile device at the current moment based on the coordinates of the current moment and a preset trajectory of the mobile device.

11. The electronic equipment according to claim 10, wherein the Kalman filter model comprises a coordinate update model and a noise update model, the predicting coordinates of the mobile device at the current moment through the Kalman filter model based on the several measured coordinates, the coordinates of the previous moment, and the noise parameters of the previous moment comprises:
outputting corresponding calculation parameters according to the coordinate update model and the noise update model respectively based on the several measurement coordinates, the coordinates of the previous moment, and the noise parameters of the previous moment;

obtaining the coordinates of the current moment according to the coordinate update model based on the several measurement coordinates, the coordinates of the previous moment, the noise parameters of the previous moment, and the calculation parameters outputted based on the noise update model;

obtaining the noise parameters of the current moment according to the noise update model based on the several measurement coordinates, the coordinates of the previous moment, the noise parameters of the previous moment, and the calculation parameters outputted based on the coordinate update model;

after adjusting the pose of the mobile device at the current moment based on the coordinates of the current moment and the preset trajectory of the mobile device, the pose adjustment method further comprises:

updating the coordinates and the noise parameters of the current moment to the coordinates and the noise parameters of the previous moment.

12. The electronic equipment according to claim 10, wherein the noise parameters comprise observation noise parameters and state noise parameters, the observation noise parameters represent noise caused by the external working environment of the mobile device, the state noise parameters represent noise caused by errors in the measurement modules.

13. The electronic equipment according to claim 12, wherein the state noise parameters comprise state noise mean values and state noise variances, the observation noise parameters comprise observation noise mean values and observation noise variances; the noise update model comprises following equations:

$$q_k = (1-d_k)q_{k-1} + d_k(X_k - AX_{k-1});$$

$$Q_k = (1-d_k)Q_{k-1} + d_k(K_k e_k e_k^T K_k^T + P_k - AP_{k-1}A^T);$$

$$r_k = (1-d_k)r_{k-1} + d_k(Z_k - HX_{kVk-1});$$

$$R_k = (1-d_k)R_{k-1} + d_k(e_k e_k^T - HP_{kVk-1}H^T);$$

wherein, $q_k$ is a mean value of the state noises of the mobile device at the current moment; $d_k=(1-b)/(1-b^{k+1})$, b is a forgetting factor, with a range of 0<b<1; $q_{k-1}$ is a mean value of the state noises of the mobile device at the previous moment; $X_k$ is the coordinates of the mobile device at the current moment; A is a state transition matrix; $X_{k-1}$ is the coordinates of the mobile device at the previous moment; $Q_k$ is a variance of the state noises of the mobile device at the current moment; $Q_{k-1}$ is a variance of the state noises of the mobile device at the previous moment; $K_k$ is a Kalman gain; is an error between a coordinate $X_k$ at the current moment and a coordinate $X_{kVk-1}$ with error at the current moment; $P_k$ is a covariance of the noise parameters of the mobile device at the current moment; $P_{k-1}$ is a covariance of the mobile device at the previous moment; $r_k$ is a mean value of the observation noises of the mobile device at the current moment; $r_{k-1}$ is a mean value of the observation noises of the mobile device at the previous moment; $Z_k$ is an observation data of the mobile device; H is an observation matrix; $X_{kVk-1}$ is a coordinate with error that the mobile device has not updated according to the variance of the state noises of the mobile device at the current moment; $R_k$ is a variance of the observation noises of the mobile device at the current moment; $R_{k-1}$ is a variance of the observation noises of the mobile device at the previous moment; $P_{kVk-1}$ is a covariance with error that the mobile device has not updated according to the observation matrix at the current moment.

14. The electronic equipment according to claim 10, wherein the several measurement modules comprise UWB modules, IMU modules, and odometer modules, the several measurement coordinates comprise first measurement coordinates, second measurement coordinates, and third measurement coordinates, the pose adjustment method further comprises:

obtaining the first measurement coordinates of the mobile device at the current moment through the UWB module;

obtaining the second measurement coordinates of the mobile device at the current moment through the IMU module; and obtaining the third measurement coordinates of the mobile device at the current moment through the odometer module.

15. The electronic equipment according to claim 14, wherein the obtaining the second measurement coordinates of the mobile device at the current moment through the IMU module comprises:

obtaining first pose data of the mobile device through the IMU module;

filtering the first pose data based on a moving average filtering algorithm; and processing the filtered first pose data based on a dead reckoning algorithm to obtain the second measurement coordinates.

16. The electronic equipment method according to claim 14, wherein the obtaining the first measurement coordinates of the mobile device at the current moment through the UWB module comprises:

communicating with several base stations through the UWB module to request ranging information, when a number of the base stations communicating with the UWB module is greater than or equal to a preset number, disconnecting communication from the base stations through the UWB module;

determining the first measurement coordinates of the mobile device based on the ranging information returned by the base stations that maintain communication with the UWB module.

* * * * *